(12) United States Patent
Li (10) Patent No.: US 9,586,484 B2
(45) Date of Patent: Mar. 7, 2017

(54) ELECTRIC-VEHICLE CONTROL DEVICE

(71) Applicant: Guodong Li, Fuji (JP)

(72) Inventor: Guodong Li, Fuji (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/962,551

(22) Filed: Dec. 8, 2015

(65) Prior Publication Data

US 2016/0094164 A1 Mar. 31, 2016

Related U.S. Application Data

(63) Continuation of application No. PCT/JP2014/064827, filed on Jun. 4, 2014.

(30) Foreign Application Priority Data

Jun. 13, 2013 (JP) .................. 2013-124312

(51) Int. Cl.
*H02P 21/00* (2016.01)
*B60L 7/14* (2006.01)
(Continued)

(52) U.S. Cl.
CPC ........ *B60L 7/14* (2013.01); *B60L 7/26* (2013.01); *B60L 15/025* (2013.01); *H02P 6/145* (2013.01);
(Continued)

(58) Field of Classification Search
CPC .............. B60L 15/025; B60L 2240/12; B60L 2240/421; H02P 21/18; H02P 27/04; H02P 6/16
See application file for complete search history.

(56) References Cited

U.S. PATENT DOCUMENTS 7,913,805 B2 3/2011 Tomita et al.
8,810,169 B2 8/2014 Thyagarajan
(Continued)

FOREIGN PATENT DOCUMENTS

EP 2 210 795 A1 7/2010
EP 2 555 415 A1 2/2013
(Continued)

OTHER PUBLICATIONS

International Search Report mailed Aug. 5, 2014 in corresponding international application PCT/JP2014/064827.
(Continued)

*Primary Examiner* — Karen Masih (57) ABSTRACT

A control device for an electric vehicle which is able to accurately control a traction motor of the electric vehicle without any delay in control timing during rapid acceleration or rapid deceleration of the motor, is provided. The control device for the electric vehicle includes an ECU and an inverter device including a motor control module. A rotation angle sensor configured to detect a rotation angle of a motor is provided, and the motor control module is provided with a rotation angle correction section configured to correct a rotation angle of a rotor of the motor which is used for vector control, by using an angular speed of an electrical angle which is the rotation angle detected by the rotation angle sensor and a differential value of the angular speed of the electrical angle.

6 Claims, 6 Drawing Sheets

(51) Int. Cl.
| | |
|---|---|
| *H02P 6/16* | (2016.01) |
| *B60L 7/26* | (2006.01) |
| *B60L 15/02* | (2006.01) |
| *H02P 6/14* | (2016.01) |

(52) U.S. Cl.
CPC ............ *H02P 6/16* (2013.01); *H02P 21/0096* (2013.01); *H02P 21/18* (2016.02); *H02P 21/22* (2016.02); *B60L 2220/42* (2013.01); *B60L 2220/44* (2013.01); *B60L 2220/46* (2013.01); *B60L 2240/12* (2013.01); *B60L 2240/421* (2013.01); *B60L 2240/526* (2013.01); *B60L 2260/28* (2013.01); *H02P 2205/05* (2013.01); *Y02T 10/643* (2013.01); *Y02T 10/648* (2013.01)

(56) References Cited

U.S. PATENT DOCUMENTS

| | | | |
|---|---|---|---|
| 9,031,724 | B2 | 5/2015 | Ozaki |
| 2010/0066283 | A1* | 3/2010 | Kitanaka ............. B60L 11/1803 318/400.02 |
| 2010/0181140 | A1 | 7/2010 | Tomita et al. |
| 2011/0029178 | A1 | 2/2011 | Kawakami et al. |
| 2011/0127938 | A1 | 6/2011 | Kawakami et al. |
| 2013/0013154 | A1 | 1/2013 | Aoki |
| 2013/0093372 | A1 | 4/2013 | Thyagarajan |
| 2013/0338866 | A1 | 12/2013 | Ozaki |

FOREIGN PATENT DOCUMENTS

| | | |
|---|---|---|
| EP | 2 587 662 A2 | 5/2013 |
| JP | 2004-040906 | 2/2004 |
| JP | 2004-150931 | 5/2004 |
| JP | 2005-237054 | 9/2005 |
| JP | 2011-200030 | 10/2011 |
| JP | 2012-178919 | 9/2012 |
| JP | 2013-085406 | 5/2013 |

OTHER PUBLICATIONS

PCT International Preliminary Report on Patentability dated Dec. 23, 2015 in corresponding International Patent Application No. PCT/JP2014/064827.

Extended European Search Report dated Nov. 17, 2016 in corresponding European Patent Application No. 14810825.1.

* cited by examiner

ELECTRIC-VEHICLE CONTROL DEVICE

CROSS REFERENCE TO THE RELATED APPLICATION

This application is a continuation application, under 35 U.S.C. §111(a), of international application No. PCT/JP2014/064827, filed Jun. 4, 2014, which is based on and claims Convention priority to Japanese patent application No. 2013-124312, filed Jun. 13, 2013, the entire disclosure of which is herein incorporated by reference as a part of this application.

BACKGROUND OF THE INVENTION

Field of the Invention

The present invention relates to a control device for an electric vehicle, and relates to, for example, a technique to correct a rotor phase (electrical angle) at the time of calculation in vector control in accordance with a command torque by using an angular speed of a rotor electrical angle and differential of the angular speed of the electrical angle, during power running control of a motor and during regenerative control of the motor.

Description of Related Art

As an electric vehicle, a vehicle including left and right wheels as drive wheels which are driven by respective independent traction motors is publicly known (Patent Document 1). Rotation of each motor is transmitted to the corresponding wheel via a reducer or reduction gear and a wheel bearing. As each motor, for example, an IPM motor (interior permanent magnet synchronous motor) is used.

RELATED DOCUMENT

Patent Document

[Patent Document 1] JP Laid-open Patent Publication No. 2012-178919
[Patent Document 2] JP Laid-open Patent Publication No. 2004-40906

Regarding a method for controlling an IPM motor, a rotation angle is detected by a motor rotation angle sensor with an interrupt function running on a CPU, and three-phase currents are supplied to the IPM motor on the basis of the detected rotation angle, thereby controlling the motor. However, a rotation angle deviation due to the difference between take-in times occurs between a rotation angle of a rotor at a time when three-phase currents (Iu, Iv, Iw) are detected (time t_A) and a rotation angle of the rotor at a time when the rotation angle (electrical angle) of the rotor is detected (time t_B). There is a problem that, due to the above deviation between the two rotation angles, the motor cannot be accurately controlled. This problem will be described in detail below.

First, t_A, t_B, t_C, Θ_A, Θ_B, and Θ_C are defined mentioned below.

t_A: the time when the three-phase currents (Iu, Iv, Iw) are detected.

t_B: the time when the rotation angle (electrical angle) of the rotor is acquired.

t_C: a time when three-phase command voltages (Vu, Vv, Vw) are applied to the motor.

Θ_A: a phase (electrical angle) of the rotor at the time when the three-phase currents (Iu, Iv, Iw) are detected.

Θ_B: a phase (electrical angle) of the rotor at the time when the rotation angle (electrical angle) of the rotor is acquired.

Θ_C: a phase (electrical angle) of the rotor at the time when the three-phase command voltages (Vu, Vv, Vw) are applied to the motor.

The t_A, t_B, and t_C are times of calculation of the CPU, which are measured and set in advance.

With the interrupt function running on the CPU, the three-phase currents (Iu, Iv, Iw) are detected at t_A, and the rotation angle (electrical angle) of the rotor is detected at t_B. On the basis of these detection values, the detected three-phase currents are converted into two-phase currents. However, there is a characteristic that the three-phase currents (Iu, Iv, Iw) and the rotation angle (electrical angle) of the rotor cannot be detected with the interrupt function running on the CPU at the same time, and an angle of the rotor at the time when the detected three-phase currents are converted into the two-phase currents is not equal to the angle at t_A.

In addition, two-phase command voltages are generated in PI control on the basis of the acquired two-phase currents, and coordinate conversion from the generated two-phase command voltages into three-phase command voltages (Vu, Vv, Vw) is performed. Thereafter, the three-phase command voltages (Vu, Vv, Vw) generated are applied to the motor at t_C. But there is a problem that as the rotation angle (electrical angle) of the rotor at t_C, the rotation angle acquired at t_B is used, and thus the motor cannot be accurately controlled.

For example, in the following conventional art, a technique to correct a delay in control timing, thereby allowing a motor to be accurately controlled is proposed (Patent Document 2). In an electric vehicle according to this conventional art, a permanent magnet synchronous motor (PM motor) is used as a drive source, and a vector control device is used for controlling rotary drive of the PM motor. In this control method, current command values O_Id and O_Iq (two-phase current command values) for a motor current are calculated on the basis of a torque command T, an actual current is detected, and three-phase currents are applied to the motor in order to cause the actual current to coincide with a command current. Flow of the control is as follows.

(1) A motor current detection process (a rotor phase is θ1)
(2) A phase detection process (a rotor phase is θ2)
(3) A process of coordinate conversion of the detected current (from three phase into two phase)
(4) A current control PI calculation process
(5) A process of coordinate conversion for generating command voltage (from two phase into three phase)
(6) Application of the command voltage to motor (a rotor phase is θ6)

In the method, the above rotor phase θ1 and rotor phase θ6 are calculated on the basis of the detected rotor phase θ2, a difference in calculation time, and a rotation speed of the motor at this time, whereby the motor can be accurately controlled. However, in this conventional art, during rapid acceleration or rapid deceleration of the motor, an error of a value for correcting a delay in control timing increases, resulting in a problem that the motor cannot be accurately controlled.

SUMMARY OF THE INVENTION

An object of the present invention is to provide a control device for an electric vehicle which control device is able to accurately control a traction motor of the electric vehicle without any delay in control timing during rapid acceleration or rapid deceleration of the motor.

Hereinafter, in order to facilitate understanding of the present invention, the present invention will be described with reference to the reference numerals in embodiments for the sake of convenience.

A motor 6 may drive either one or both of a front wheel 3 and a rear wheel 2 of the vehicle and may constitute a part of an in-wheel motor drive device 8 which includes the motor 6, a wheel bearing 4, and a reducer 7.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
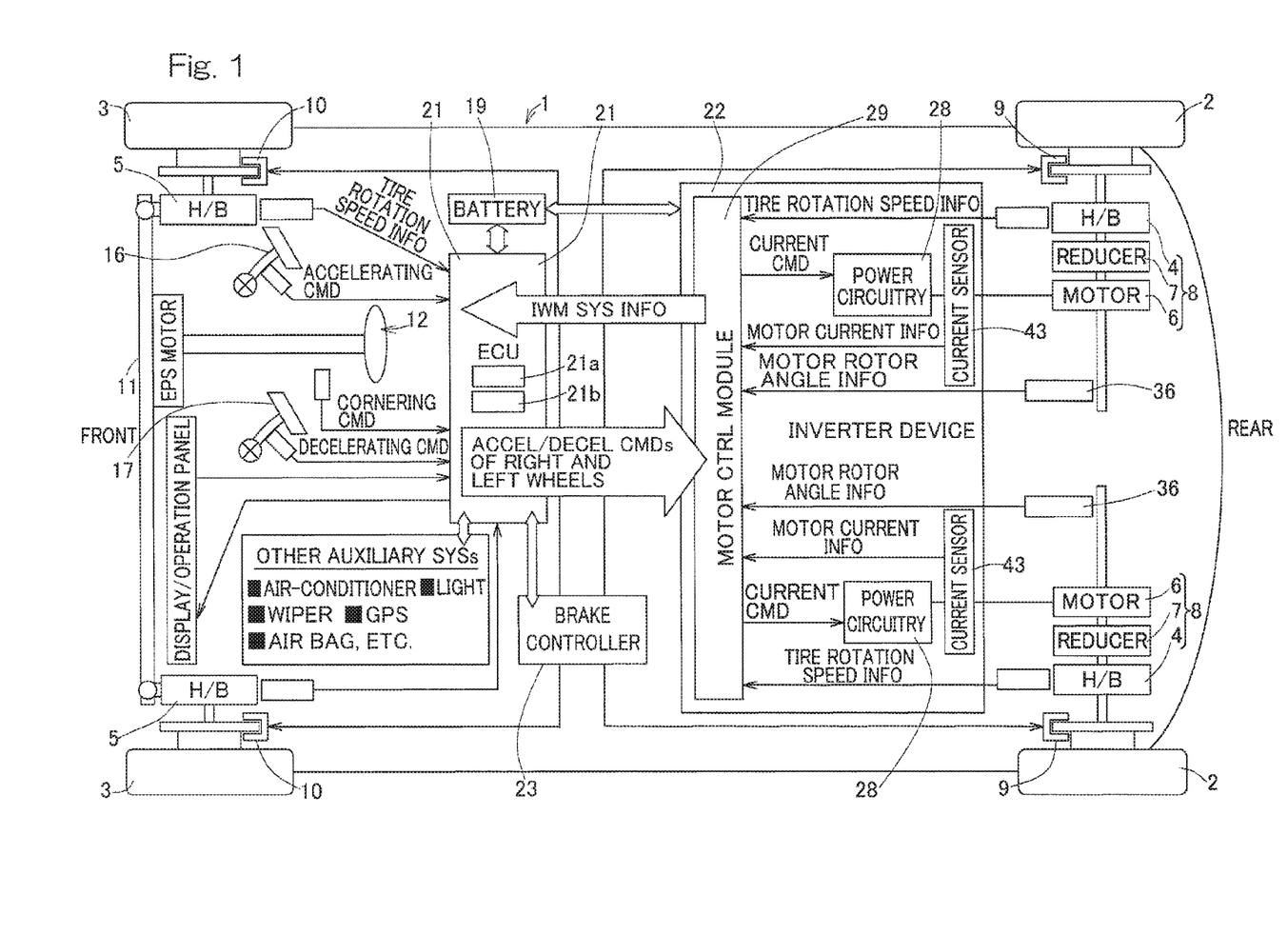
FIG. 1 is a block diagram of a schematic configuration showing an electric vehicle according to a first embodiment of the present invention in a plan view.

A control device for an electric vehicle according to a first embodiment of the present invention will be described with reference to FIGS. 1 to 6. FIG. 1 is a block diagram of a schematic configuration showing the electric vehicle according to the embodiment in a plan view. As shown in FIG. 1, the electric vehicle is a four-wheel vehicle which includes a vehicle body 1 with left and right rear wheels 2 as drive wheels and with left and right front wheels 3 as driven wheels which are steering wheels. The drive wheels 2 and the driven wheels 3 are both equipped with tires and are supported by the vehicle body 1 via respective wheel bearings 4 and 5.

In FIG. 1, the wheel bearings 4 and 5 are labeled with "H/B" which is an abbreviation for hub bearing. The left and right drive wheels 2, 2 are driven by respective independent traction motors 6, 6. Rotation of each motor 6 is transmitted via a reducer 7 and the wheel bearing 4 to the corresponding wheel 2. The motor 6, the reducer 7, and the wheel bearing 4 are integrally assembled with each other to form an in-wheel motor drive device 8. The in-wheel motor drive device 8 is partly or entirely disposed within the wheel 2. The reducer 7 is composed of, for example, a cycloidal reducer. The wheels 2 and 3 are equipped with respective electromechanical brakes 9 and 10. The steering wheels 3, 3, which are the left and right front wheels, can be turned via a turning mechanism 11 and are steered with steering portion 12 such as a steering wheel.

Figure 2:
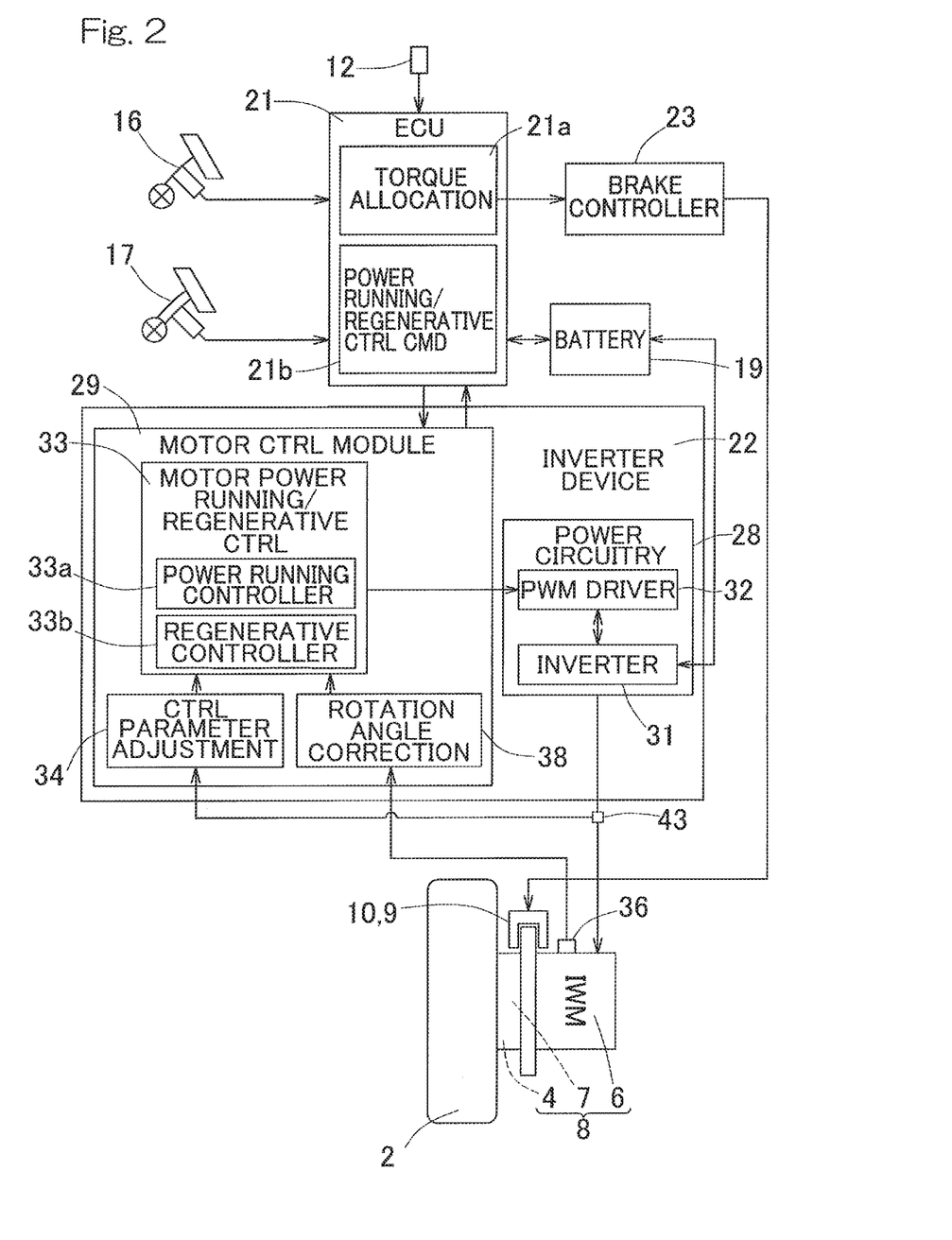
FIG. 2 is a block diagram of a schematic configuration of an inverter device and the like of the electric vehicle.

FIG. 2 is a block diagram of a schematic configuration of an inverter device and the like of the electric vehicle. As shown in FIG. 2, the electric vehicle includes an ECU 21 which is an electric control unit configured to perform general control of the vehicle, and an inverter device 22 configured to perform control of the traction motors 6 according to commands from the ECU 21. The ECU 21 includes a computer, programs which are executed by the computer, and various electronic circuits. The ECU 21 includes a torque allocation section 21a and a power running/regenerative control command section 21b.

The torque allocation section 21a is configured to generate an accelerating/decelerating command as a torque command value, which is to be sent to the traction motors 6, 6 of the left and right wheels 2, 2, on the basis of an accelerating command outputted from an accelerator manipulation portion 16, a decelerating command outputted from a brake manipulation portion 17, and a cornering command from the steering portion 12, and to output the accelerating/decelerating command to each inverter device 22. The torque allocation section 21a has a function to, in response to the decelerating command outputted from the brake manipulation portion 17, generate a braking torque command value allocated to regenerative braking of the motor 6 and a braking torque command value allocated to the operation of the electromechanical brakes 9 and 10. The braking torque command value allocated to regenerative braking is reflected in the accelerating/decelerating command which is to be sent to the motors 6, 6 of the left and right wheels 2, 2. The braking torque command value allocated to the operation of the brakes 9 and 10 is outputted to a brake controller 23.

The power running/regenerative control command section 21b is configured to send a command flag configured to switch between acceleration (power running) and deceleration (regeneration), to a motor power running/regenerative control section 33 of a motor control module 29 described later.

The inverter device 22 includes a power circuitry 28 provided for each motor 6, and the motor control module 29 configured to control the power circuitry 28. The power circuitry 28 includes an inverter 31 configured to convert a DC power from a battery 19 into a three-phase AC power used for power running and regeneration of the motor 6, and a PWM driver 32 configured to control the inverter 31. The motor 6 is composed of a three-phase synchronous motor or the like. The motor 6 is provided with a rotation angle sensor 36 configured to detect a rotation angle as an electrical angle of a rotor of the motor. The inverter 31 includes a plurality of semiconductor switching elements, and the PWM driver 32 performs pulse width modulation according to an inputted current command and sends an ON/OFF command to each of the semiconductor switching elements.

The motor control module 29 includes a computer, programs which are executed by the computer, and various electronic circuits. The motor control module 29 includes the motor power running (drive)/regenerative control section 33 as a basic control section. The motor power running/ regenerative control section 33 is configured to perform conversion into a current command in accordance with the accelerating (power running)/decelerating (regeneration) command such as the torque command sent from the ECU 21, which is primary control unit, and to send the current command to the PWM driver 32 of the power circuitry 28. Switching between acceleration (power running) and deceleration (regeneration) is performed on the basis of the command flag from the power running/regenerative control command section 21b of the ECU 21. The motor power running/regenerative control section 33 includes power running controller 33a and regenerative controller 33b, and either the power running controller 33a or the regenerative controller 33b is selectively used on the basis of the command flag from the power running/regenerative control command section 21b.

The motor power running/regenerative control section 33 generates a command current value to the motor 6, on the basis of the command flag, by using a torque map which is preset in the inverter. The motor power running/regenerative control section 33 detects a value of current which actually flows through the motor 6 in this case, and controls the motor 6 through PI control in order to match the current value with the command current.

The motor control module 29 also includes a control parameter adjustment section 34 and a rotation angle (phase) correction section 38. The control parameter adjustment section 34 adjusts a PI control gain which is used in controlling the motor 6. Meanwhile, the rotation angle (phase) correction section 38 acquires the rotation angle as the electrical angle of the rotor of the motor 6 from the rotation angle sensor 36, and corrects the rotation angle as described later, whereby vector control can be realized with high accuracy.

In the present embodiment, signal communication among the ECU 21, the inverter device 22, the brake controller 23, and the steering portion 12 is performed with controller area network (CAN) communication.

Figure 3A:
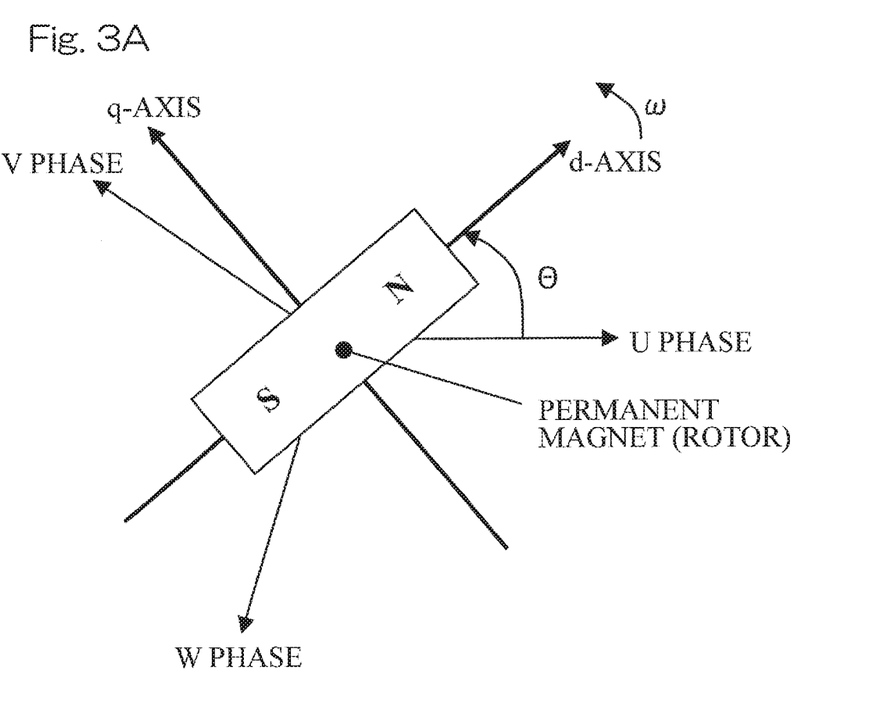
FIG. 3A is a schematic configuration diagram of an IPM motor of the electric vehicle.

FIG. 3A shows a schematic configuration diagram of an IPM motor of the electric vehicle. As shown in FIG. 3A, in the case where the motor which drives the wheel is an IPM motor, that is, an interior magnet synchronous motor, a magnetic resistance in the direction of a q-axis orthogonal to a d-axis which is a magnet axis of the rotor is lower than that in the direction of the d-axis, thus the rotor has a salient pole structure, and a q-axis inductance Lq becomes higher than a d-axis inductance Ld. Depending on the salient structure, a reluctance torque Tr can be used in addition to a magnetic torque Tm, so that a high torque and high efficiency can be achieved. The magnet torque Tm is a torque generated by attraction and repelling between a magnetic field generated by a permanent magnet of a rotor and a rotating magnetic field generated by a winding. The reluctance torque Tr is a torque generated by a salient pole portion of the rotor being attracted to the rotating magnetic field generated by the winding.

Figure 3B:
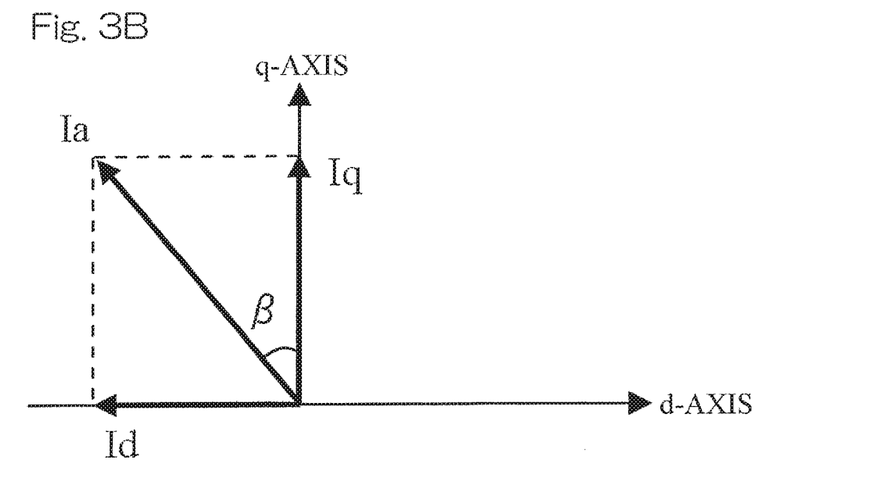
FIG. 3B is a diagram illustrating an example where a primary current flowing to the IPM motor is split into a d-axis current and a q-axis current.

A total torque generated by the motor is as follows.

$$T = p \times \{Ke \times Iq + (Ld - Lq) \times Id \times Iq\}$$
$$= Tm + Tr$$

p: the number of pole pairs
Ld: the d-axis inductance of the motor
Lq: the q-axis inductance of the motor
Ke: an effective value of a motor induced voltage constant A vector control method is well-known in which, as shown in FIG. 3B, a primary current Ia flowing to the IPM motor is split into a q-axis current Iq which is a torque generation current and a d-axis current Id which is a magnetic flux generation current, and the q-axis current Iq and the d-axis current Id can be independently controlled.

$$Id = Ia \times \sin \beta$$

$$Iq = Ia \times \cos \beta$$

β: a current advance angle

Figure 4:
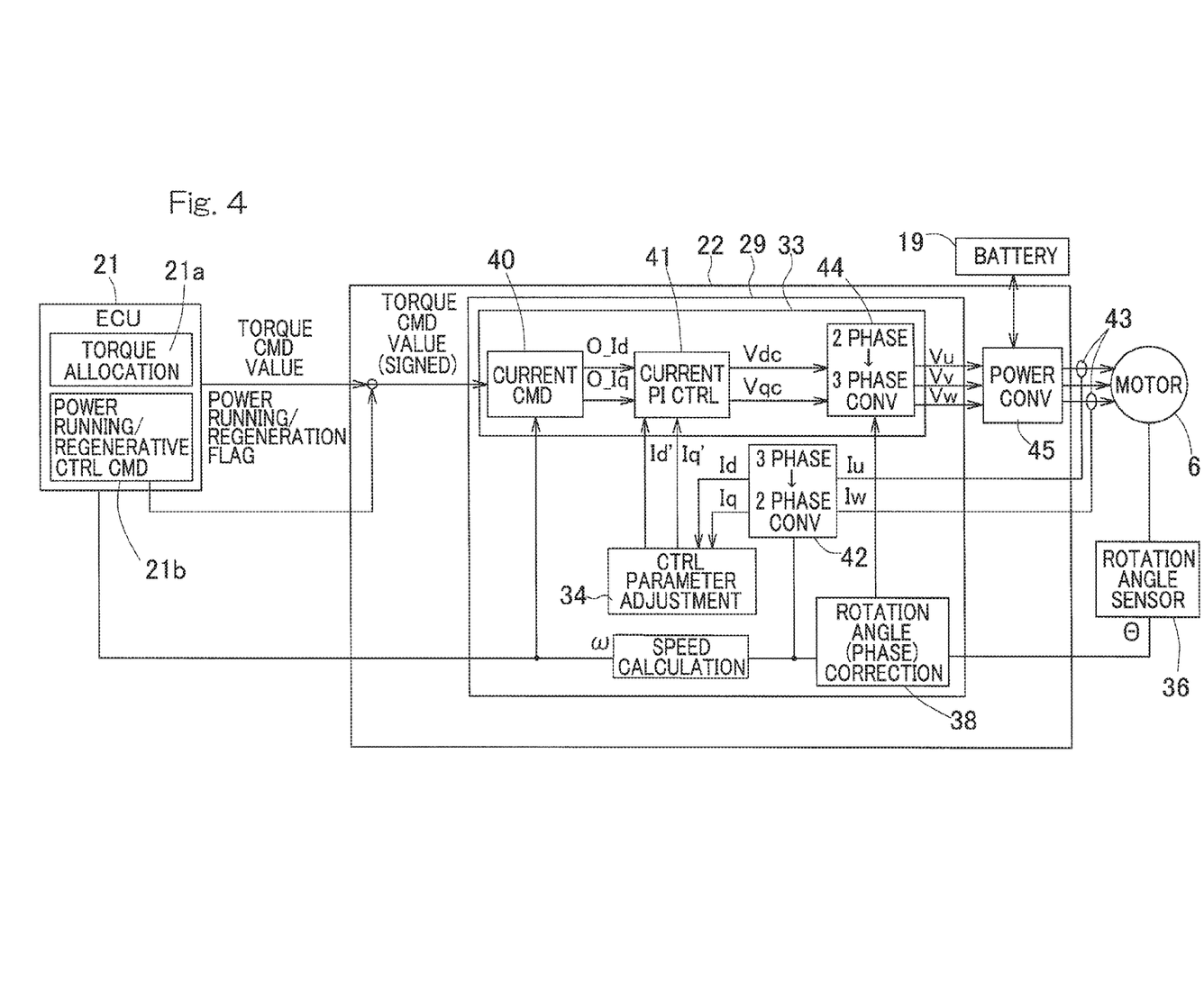
FIG. 4 is a block diagram of a motor control module of the electric vehicle including a torque control system.

FIG. 4 is a block diagram including a torque control system of the motor control module 29 of the electric vehicle. A description will be given also with reference to FIG. 2. The motor control module 29 is configured to control a motor drive current and includes a current command section 40. The current command section 40 generates an appropriate command current by using the torque map which is preset in the inverter of the inverter device 22, on the basis of a detection value of a drive current which is applied to the motor 6 and is detected by the rotation angle sensor 36 and of a torque command value which is the accelerating/decelerating command generated by the torque allocation section 21a of the ECU 21. That is, the current command section 40 performs PI feedback control for eliminating a deviation relative to the command current value generated in the inverter, in accordance with the torque command value from the ECU 21. The direction of the command current (the sign of the command current) is switched on the basis of the command flag sent from the power running/regenerative control command section 21b of the ECU 21.

The motor power running/regenerative control section 33 acquires the rotation angle of the rotor of the motor 6 from the rotation angle sensor 36 and performs vector control. Between the motors 6 provided to the left and right rear wheels 2, 2 on the vehicle body, torque generation directions are different from each other during power running and during regeneration. That is, when each motor 6 is seen from the direction of an output shaft thereof, the motor 6 for driving the left rear wheel generates a torque in the CW direction, and the motor 6 for driving the right rear wheel generates a torque in the CCW direction (the left and right sides are determined by the direction in which the vehicle is seen from the rear side). So the each torque generated by the corresponding motors 6 at the left and right sides is transmitted, via the reducer 7 and the wheel bearing 4, to the tire while the direction of one torque is reversed relative to the other torque. In addition, the torque generation directions during regeneration in the motors 6 at the left and right tires are different from the torque generation directions during power running, in the opposite relationship to each other.

Regarding the torque map, an appropriate torque command value is calculated from a maximum torque control table on the basis of an accelerating signal and the rotation speed of the motor 6. The current command section 40 generates command values of the primary current (Ia) and the current advance angle (β) of the motor 6 on the basis of the calculated torque command value. The current command section 40 generates two command currents, a d-axis current (magnetic field component) O_Id and a q-axis current O_Iq on the basis of the values of the primary current (Ia) and the current advance angle (β).

A current PI control section 41 calculates control variables Vdc and Vqc as voltage values in the PI control on the basis of the values of the d-axis current O_Id and the q-axis current O_Iq outputted from the current command section 40 and of two-phase currents Id' and Iq' resulting from adjustment, by the control parameter adjustment section 34, of two-phase currents Id and Iq which are calculated by a three phase/two phase conversion section 42 on the basis of the motor current and the rotor angle. The three phase/two phase conversion section 42 calculates a v-phase current (Iv), which is obtained by the following equation, Iv=−(Iu+Iw), on the basis of detection values of a u-phase current (Iu) and a w-phase current (Iw) of the motor 6 which are detected by current sensors (motor current detection portion) 43 which detect each motor current, and converts the three-phase currents Iu, Iv, and Iw into two-phase currents Id and Iq. The rotor angle of the motor 6 used for this conversion is obtained from the rotation angle sensor 36. The detected value of the rotation angle (phase) is corrected by the rotation angle (phase) correction section 38, whereby the motor 6 can be accurately controlled.

A two phase/three phase conversion section 44 converts the inputted two-phase control variables Vdc and Vqc, by use of the value corrected by the rotation angle (phase) correction section 38, into three-phase PWM duties Vu, Vv, and Vw. A power conversion section 45 corresponds to the power circuitry 28 in FIG. 2, performs PWM control of the inverter 31 in accordance with the PWM duties Vu, Vv, and Vw, and drives the motor 6.

Figure 5:
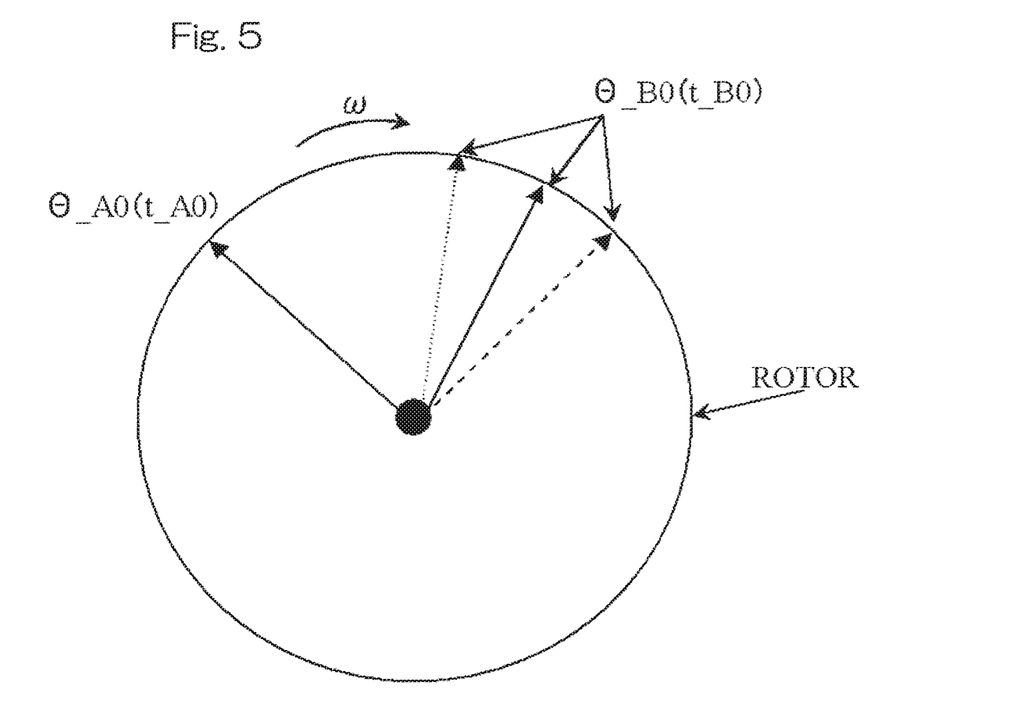
FIG. 5 is a diagram representing an image for deriving calculation formulas when the rotor of the motor shifts from an angle A0 toward an angle B0.

FIG. 5 is a diagram representing an image for deriving calculation formulas in the case that the rotor of the motor shifts from an angle A0 (electrical angle) toward an angle B0 (electrical angle). Angle A0 (electrical angle) is indicated as Θ_A0. Angle B0 (electrical angle) is indicated as Θ_B0. ω is an angular speed of the rotor electrical angle (an angular speed at a time when the rotor starts from the angle A0). t_A0 is a time when the rotor starts from the angle A0. t_B0 is a time when the rotor arrives at the angle B0.

In the case of shift from the angle A0 toward the angle B0, a rotation state can be divided into three rotation states 1, 2, and 3 described below.

[Rotation state 1] The rotor rotates at a constant speed.

A calculation formula for the angle B0 is established as follows (a solid line in FIG. 5).

Angle $B0$ (electrical angle)=angle $A0$ (electrical angle)+ω×($t\_B0-t\_A0$)

[Rotation state 2] The rotor rotates while accelerating (a broken line in FIG. 5).

Angle $B0$(electrical angle)=angle $A0$(electrical angle)+ω×($t\_B0\ t\_A0$)+1/2×dω/dt×($t\_B0-t\_A0$)^2

Since the value of dω/dt is positive, +1/2×dω/dt×(t_B0−t_A0)^2 is an angle component which advances due to the acceleration.

[Rotation state 3] The rotor rotates while decelerating (a dotted line in FIG. 5).

Angle B0 (electrical angle) is obtained by the same formula in the rotation state 2.

Since the value of dω/dt is negative, +1/2×dω/dt×(t_B0−t_A0)^2 is an angle component which delays due to the deceleration.

Figure 6:
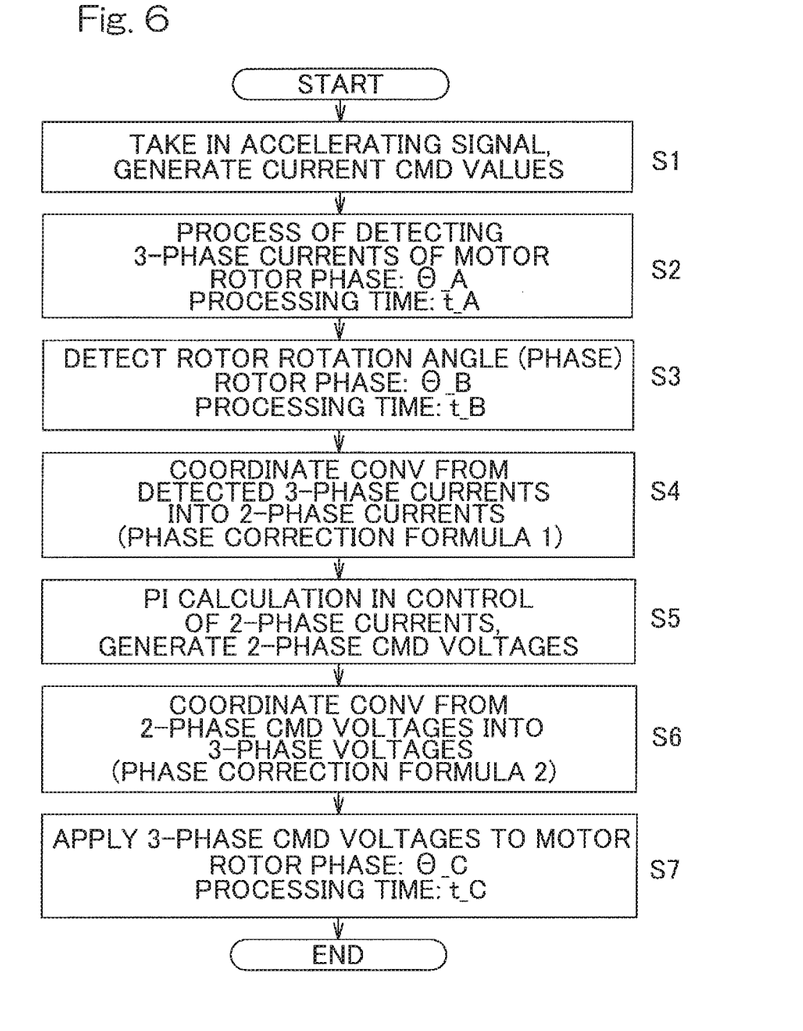
FIG. 6 is a flowchart for adjustment of the rotor rotation angle (phase) of the motor.

FIG. 6 is a flowchart for adjustment of the rotor rotation angle (phase) of the motor. This flowchart is executed with an interrupt function running on a CPU at regular time intervals. After this process starts, an accelerating signal is taken in, and current command values are generated (step S1). Next, a process of detecting three-phase currents of the motor is performed, the rotor phase at this time is denoted by Θ_A, and the processing time at this time is denoted by t_A (step S2). Subsequently, a rotor rotation angle (phase) is detected (step S3). The rotor phase at this time is denoted by ΘB, and the processing time at this time is denoted by t_B.

Next, the process proceeds to step S4, and coordinate conversion from the detected three-phase currents (Iu, Iv, Iw) into two-phase currents (Id, Iq) is performed. Coordinate conversion formulas from the detected three-phase currents into the two-phase currents in this case are the following coordinate conversion formulas.

$Id=\sqrt{2}\times[Iv\times\sin \Theta - Iu\times\sin(\Theta-2\pi/3)]$ $Iq=\sqrt{2}\times[Iv\times\cos \Theta - Iu\times\cos(\Theta-2\pi/3)]$ The current Iw is obtained by a formula, Iw=−(Iu+Iv).

The above Θ is calculated by the rotation angle (phase) correction section 38 (FIG. 2) on the basis of the following phase correction formula 1.

Θ=Θ_A=Θ_B−ω×(t_B−t_A)−1/2×dω/dt×[Phase correction formula 1]

In the case of performing power running control, the value of dω/dt is positive.

In the case of performing regenerative control, the value of dω/dt is negative.

The ω and the dω/dt are calculated with another interrupt function.

PI calculation in control of the two-phase currents is performed by the current PI control section 41 (FIG. 4) to generate two-phase command voltages (Vd, Vq) (step S5). Subsequently, coordinate conversion from the two-phase command voltages (Vd, Vq) into three-phase command voltages (Vu, Vv, Vw) is performed (step S6). Coordinate conversion formulas from the two-phase command voltages into the three-phase command voltages in this case are the following coordinate conversion formulas.

$Vu=\sqrt{(2/3)}\times[Vd\times\cos \Theta - Vq\times\sin \Theta]$ $Vv=\sqrt{(2/3)}\times[Vd\times\cos(\Theta-2\pi/3)-Vq\times\sin(\Theta-2\pi/3)]$ $Vw=-(Vu+Vv)$ (Vd: d-axis voltage, Vq: q-axis voltage)

The above Θ is calculated by the rotation angle (phase) correction section 38 (FIG. 2) on the basis of the following phase correction formula 2.

Θ=Θ_C=Θ_B+ω×(t_C−t_B)+1/2×dω/dt×[Phase correction formula 2]

In the case of performing power running control, the value of dω/dt is positive.

In the case of performing regenerative control, the value of dw/dt is negative.

Next, the process proceeds to step S7, and the three-phase command voltages are applied to the motor. The rotor phase at this time is denoted by Θ_C, and the processing time is denoted by t_C. Thereafter, the process is ended.

Functions and advantageous effects will now be described. The motor control module 29 controls the power circuitry 28 on the basis of the accelerating/decelerating command, which is the torque command or the like sent from the ECU 21, and performs torque control of output of the motor 6. The rotation angle of the motor 6 is detected by the rotation angle sensor 36 and is used for vector control. The rotation angle correction section 38 of the motor control module 29 corrects the rotation angle of the rotor of the motor 6 in accordance with the torque command from the ECU 21 by using the angular speed ω of the electrical angle, which is the rotation angle detected by the rotation angle sensor 36, and the differential value dω/dt of this electrical angle.

When, as in the conventional art, the rotation angle of the motor is corrected by using the angular speed of the electrical angle alone which is the detected rotation angle of the motor, an error of a value for correcting a delay in control timing during rapid acceleration or rapid deceleration of the motor increases, so that the motor cannot be accurately controlled. In this embodiment, the rotation angle of the motor 6 is corrected by using not only the angular speed ω of the electrical angle but also the differential value dw/dt of the angular speed of the electrical angle, whereby no delay in control timing even during rapid acceleration or rapid deceleration of the motor 6 occurs, and the motor 6 can be accurately controlled. When the motor 6 rotates at a constant speed, the rotation angle correction section 38 can accurately control the rotation angle of the motor 6 without taking the differential value dω/dt of the angular speed of the electrical angle into consideration, that is, by using the angular speed ω of the electrical angle alone.

The three phase/two phase conversion section 42 converts the three-phase currents (Iu, Iv, Iw) flowing to the motor 6 into the two-phase currents (Id, Iq) on the basis of the coordinate conversion formulas. In the coordinate conversion formulas, a term that takes the differential value dω/dt of the angular speed of the electrical angle into consideration, that is, 1/2×dω/dt×(t_B−t_A)^2, is put, whereby the rotation angle which is the electrical angle of the rotor of the motor 6 can be accurately corrected regardless of being during acceleration or deceleration of the motor 6.

Also, the two phase/three phase conversion section 44 converts the two-phase command voltages (Vd, Vq) into the three-phase command voltages (Vu, Vv, Vw) on the basis of the coordinate conversion formulas. In the coordinate conversion formulas, a term that takes the differential value dω/dt of the angular speed of the electrical angle into consideration, that is, 1/2×dω/dt×(t_C−t_B)^2, is put, whereby the rotation angle which is the electrical angle of the rotor of the motor 6 can be accurately corrected regardless of being during acceleration or deceleration of the motor 6.

The present invention is also applicable to an electric vehicle whose wheels are driven by motors disposed outside the wheels, such as an on-board type, in addition to an in-wheel motor type, as a type in which wheels are driven by respective motors. Furthermore, the present invention is also applicable to an electric vehicle whose four wheels are driven by respective motors, or an electric vehicle whose wheels are driven for running by a single motor.

Although the preferred embodiments of the present invention has been fully described with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included within the scope.

REFERENCE NUMERALS 2, 3 . . . wheel
4 . . . wheel bearing
6 . . . motor
7 . . . reducer
8 . . . in-wheel motor drive device
21 . . . ECU
22 . . . inverter device
28 . . . power circuitry
29 . . . motor control module
31 . . . inverter
33a . . . power running controller
33b . . . regenerative controller
36 . . . rotation angle sensor
38 . . . rotation angle correction section
42 . . . three phase/two phase conversion section
44 . . . two phase/three phase conversion section

What is claimed is:

1. A control device for an electric vehicle, comprising:
an ECU which is an electric control unit configured to perform general control of the vehicle;
an inverter device including: a power circuitry having an inverter configured to convert a DC power into an AC power used to drive a traction motor; and a motor control module configured to control the power circuitry in accordance with a torque command from the ECU; and
a rotation angle sensor configured to detect a rotation angle of the motor, wherein
the motor control module acquires a rotation angle of a rotor of the motor from the rotation angle sensor and performs a vector control, and
the motor control module comprises a rotation angle correction section configured to correct the rotation angle of the rotor of the motor which is detected by the rotation angle sensor and used for the vector control, by using an angular speed of an electrical angle which is the rotation angle detected by the rotation angle sensor and a differential value of the angular speed of this electrical angle.

2. The control device for the electric vehicle as claimed in claim 1, further comprising motor current detection portion configured to detect a current of the motor, wherein
the motor control module includes a three phase/two phase conversion section configured to convert three-phase currents (Iu, Iv, Iw) flowing to the motor into two-phase currents (Id, Iq) on the basis of the current detected by the motor current detection portion and the rotation angle of the motor detected by the rotation angle sensor, and
coordinate conversion formulas from the three-phase currents (Iu, Iv, Iw) into the two-phase currents (Id, Iq) in the three phase/two phase conversion section are the following coordinate conversion formulas:

$$Id = \sqrt{2} \times [Iv \times \sin\Theta\_Iu \times \sin(\Theta - 2\pi/3)], \text{ and}$$

$$Iq = \sqrt{2} \times [Iv \times \cos\Theta\_Iu \times \cos(\Theta - 2\pi/3)],$$

where $\Theta = \Theta\_A = \Theta\_B - \omega \times (t\_B - t\_A) - 1/2 \times d\omega/dt \times (t\_B - t\_A)^2$.

3. The control device for the electric vehicle as claimed in claim 2, wherein
the motor control module includes: power running controller configured to perform power running control of the motor; and regenerative controller configured to perform regenerative control of the motor,
when the power running control of the motor is performed by the power running controller, the rotation angle correction section sets the differential value dω/dt of the angular speed as a positive value, and sets 1/2×dω/ dt×(t_B t_A)^2 in the coordinate conversion formulas as an angle component which advances due to acceleration, and when the regenerative control of the motor is performed by the regenerative controller, the rotation angle correction section sets the differential value dω/dt of the angular speed as a negative value, and sets 1/2×dω/dt× (t_B−t_A)^2 in the coordinate conversion formulas as an angle component which delays due to deceleration.

4. The control device for the electric vehicle as claimed in claim 1, wherein the motor control module includes a two phase/three phase conversion section configured to convert two-phase command voltages (Vd, Vq) into three-phase command voltages (Vu, Vv, Vw), and coordinate conversion formulas from the two-phase command voltages (Vd, Vq) into the three-phase command voltages (Vu, Vv, Vw) in the two phase/three phase conversion section are the following coordinate conversion formulas:

$Vu=\sqrt{(2/3)} \times [Vd \times \cos\Theta - Vq \times \sin\Theta]$, $Vv=\sqrt{(2/3)} \times [Vd \times \cos(\Theta-2\pi/3) - Vq \times \sin(\Theta-2\eta/3)]$, and $Vw=-(Vu+Vv)$, where $\Theta=\Theta\_C=\Theta\_B+\omega \times (t\_C-t\_B)+1/2 \times d\omega/dt \times (t\_C-t\_B)^2$.

5. The control device for the electric vehicle as claimed in claim 4, wherein the motor control module includes: power running controller configured to perform power running control of the motor; and regenerative controller configured to perform regenerative control of the motor, when the power running control of the motor is performed by the power running controller, the rotation angle correction section sets the differential value dω/dt of the angular speed as a positive value, and sets 1/2×dω/dt×(t_C t_B)^2 in the coordinate conversion formulas as an angle component which advances due to acceleration, and when the regenerative control of the motor is performed by the regenerative controller, the rotation angle correction section sets the differential value dω/dt of the angular speed as a negative value, and sets 1/2×dω/dt× (t_C−t_B)^2 in the coordinate conversion formulas as an angle component which delays due to deceleration.

6. The control device for the electric vehicle as claimed in claim 1, wherein the motor drives either one or both of a front wheel and a rear wheel of the vehicle and constitutes a part of an in-wheel motor drive device which includes the motor, a wheel bearing, and a reducer.

* * * * *

UNITED STATES PATENT AND TRADEMARK OFFICE
CERTIFICATE OF CORRECTION

PATENT NO. : 9,586,484 B2
APPLICATION NO. : 14/962551
DATED : March 7, 2017
INVENTOR(S) : Guodong Li Page 1 of 1

It is certified that error appears in the above-identified patent and that said Letters Patent is hereby corrected as shown below:

In the Claims

Column 10, Line 51 (Claim 2, Line 15), delete "$Id=\sqrt{2}\times[Iv\times\sin\Theta\_Iu\times\sin(\Theta-2\pi/3)],$" and insert -- $Id = \sqrt{2} \times [Iv \times \sin\Theta - Iu \times \sin(\Theta - 2\pi/3)],$ --, therefor Column 10, Line 55 (Claim 2, Line 2), delete "$Iq=\sqrt{2}\times[Iv\times\cos\Theta\_Iu\times\cos(\Theta-2\pi/3)],$" and insert -- $Iq = \sqrt{2} \times [Iv \times \cos\Theta - Iu \times \cos(\Theta - 2\pi/3)],$ --, therefor.

Column 11, Line 1 (Claim 3, Line 1), delete "(t_B t_A)^2" and insert --(t_B-t_A)^2--, therefor.

Column 11, Line 23 (Approx.) (Claim 4, Line 13), delete "-2η/3)]," and insert -- -2π/3)],--, therefor.

Column 12, Line 11 (Claim 5, Line 11), delete "(t_C t_B)^2" and insert --(t_C-t_B)^2--, therefor.

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*